United States Patent
Pfeiffer et al.

[11] 3,785,430
[45] Jan. 15, 1974

[54] COOLING UNIT FOR LARGE POLYMERIZATION VESSELS

[75] Inventors: Kurt Pfeiffer; Johannes Dietrich; Günter Beckmann; Karl-Heinz Herkt, all of Marl, Germany

[73] Assignee: Chemische Werke Huls Aktiengesellschaft, Marl, Germany

[22] Filed: July 30, 1971

[21] Appl. No.: 167,568

[30] Foreign Application Priority Data
Aug. 1, 1970   Germany............... P 20 38 363.5

[52] U.S. Cl.............................. 165/1, 165/105
[51] Int. Cl............................................ F28d 15/00
[58] Field of Search............................. 165/1, 105

[56] References Cited
UNITED STATES PATENTS
3,476,725  11/1969  Jirik.................... 165/105

Primary Examiner—Charles Sukalo
Attorney—Craig, Antonelli & Hill

[57] ABSTRACT

This invention relates to a process and apparatus for the cooling of polymerization charges in emulsion, suspension, solution, and bulk polymerizations in connection with incompletely filled polymerization reactors or vessels having capacities of 40 $m^3$ or greater and thermal loads of more than 500,000 kcal/h with the aid of a reflux condenser or cooler which is in communication with the gas space of a polymerization vessel.

5 Claims, 1 Drawing Figure

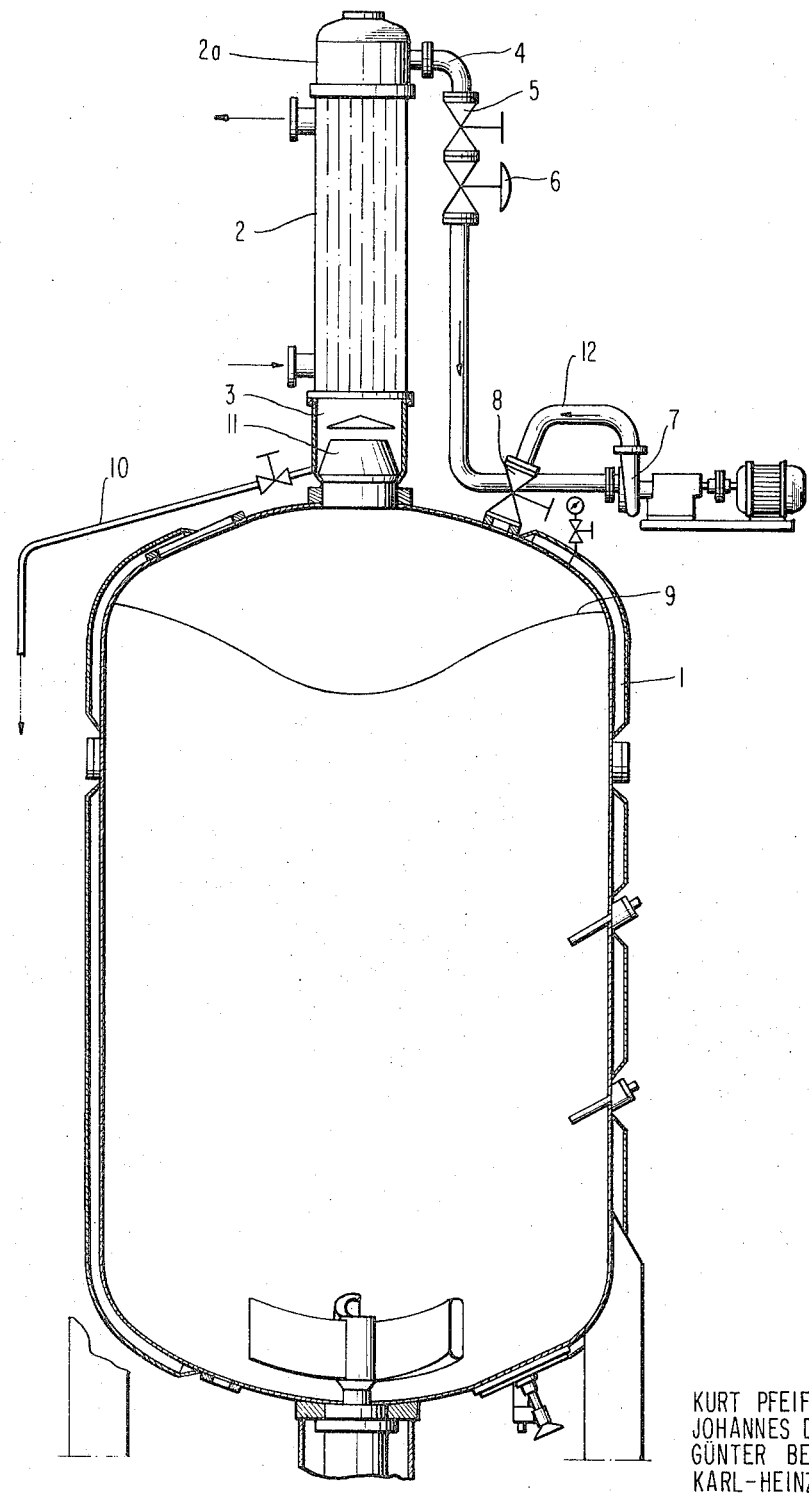

COOLING UNIT FOR LARGE POLYMERIZATION VESSELS

Polymerization reactions are customarily carried out in compression-proof agitator-equipped reactors or vessels. The polymers are obtained either finely dispersed or emulsified in a carrier liquid (emulsion or suspension polymerization), or they are dissolved immediately after the production in the carrier liquid (solution polymerization). If the monmer proper is employed as the carrier liquid, one speaks of a bulk polymerization.

Polymerization reactions are exothermic. During the polymerization process, an amount of heat must be removed which is composed of the product of the specific polymerization heat and of the mass of the formed polymeride, the heat of agitation, and the heating energy. In case of rather small polymerization vessels having a size of up to 20 $m^3$ in capacity, this amount of heat can be removed by cooling the walls. As long as no deposits, impairing the heat flow, are formed on the reactor walls during the polymerization, it is also possible to cool larger vessels by means of cooling coils which in addition to the wall cooling system, are mounted on the inside of the vessel. However, if deposits are formed, the use of cooling coils is not suitable, since they can be cleaned only with difficulties. Therefore, reflux condensers or coolers are utilized— especially in case of vessels having capacities of more than 20 $m^3$ — which are in communication with the gas space of the reactor, and in which a part of condensible components of the gas is precipitated above the liquid polymerization charge and can flow back into the vessel.

The German Pat. 1,013,870 describes a cooling system for polymerization reactors in which gas is removed from the hood, is then compressed and is thereupon introduced into the reactor, either in part or in its entirety, dissolved in the carrier liquid or in the monomer.

A gas circulation method with partial condensation is described in the Geraman DAS 1,025,143. Gas is thereby removed from the head of the condenser, compressed, and fed into the reactor through injection nozzles which are fixed the bottom of the polmerization reactor.

The German DOS 1,495,145 describes a reflux cooling system in which the temperature of the polymerization charge is controlled, by regulating the coolant supply to the reflux cooler in dependence on the polymerization temperature.

All of the above-mentioned processes exhibit disadvantages which have a particularly grave effect on the polymerization of reactor or vessel contents of more than 40 $m^3$.

The compressors required for the realization of the process according to German Patent 1,013,870 are expensive in their acquisition and costly in their operation, especially since the entrained solid particles present in trace amounts in the gaseous stream can damage the compressor.

The process according to DAS 1,025,143 is uneconomical or technically non-realizable when applied to the polymerization of reactor contents of 40 $m^3$ or greater. The amount of circulating gas must be brought to a pressure larger than the sum of the hydrostatic pressure in the reactor and the pressure drop at the injection nozzles. The pressure is generally higher than 4 meters $H_2O$ column and can be produced with the aid of a radial cylinder compressor or a rotary piston compressor. These machines are mechanically sensitive to any entrained polymer particles and have a high energy consumption. In case of polymerization reactors having contents greater than 40 $m^3$, this cooling method is difficult to carry out during the polymerization of foaming charges, because the gas space of the polymerization vessel is filled with foam already a short time after the beginning of the process.

Also the method described in DOS 1,495,145 is only poorly suitable for the polymerization of charges of 40 $m^3$ or larger. During the polymerization of vinyl chloride in a reactor having a size of more than 40 $m^3$, thermal loads of more than 500,000 kcal/h occur. Tests have demonstrated that, in this process, the heat-transfer rates in the reflux cooler, instead of the rates being between 500 and 5,000 $kcal/m^2 \cdot h \cdot °C$ which are usually expected for condensing gases, were only less than 300 $kcal/m^2 \cdot h \cdot °C$., and that these coefficients varied considerably and additionally were particularly low during the polymerizing phase with the highest reaction velocity. This had as a consequence that the temperature could be controlled only with difficulties. After the tests, the inlets of the reflux cooler pipes were covered with deposits of the product.

The present invention is based on the task to provide a reflux cooling process and an apparatus for the realization thereof which ensure a completely satisfactory cooling function also during polymerizations in vessels with contents of 40 $m^3$ and greater and with occurring thermal loads of more than 500,000 kcal/h.

The underlying problems are solved according to the present invention in that the gas is either force-fed from the gas space of the polymerization vessel through the reflux condenser or cooler into the reflux condenser or cooler head and from there into the gas space of the polymerization reactor or is force-fed in the opposite direction from the reflux condenser or cooler head through the reflux condenser or cooler into the gas space of the polymerization vessel and from there into the reflux condenser or cooler head.

The advantages attained by the present invention reside especially in the completely satisfactory removal of heat from polymerization charges of 40 $m^3$ and larger, and in a very good control of the temperature of these polymerization batches. A further advantage of the present invention resides in the simple apparatus and the economic mode of operation attainable thereby.

These and other objects, features and advantages of the present invention will become more apparent from the following description when taken in connection with the accompanying drawing which shows, for purposes of illustration only, one embodiment of the present invention and wherein:

The single FIGURE is a schematic view illustrating a polymerization reactor with a reflux cooling unit in accordance with the present invention.

Referring now to the single FIGURE of the drawing, reference numeral 1 designates therein a polymerization reactor or vessel which is operated with a liquid level, i.e., is not completely filled. Due to the agitation by conventional means, the surface of the liquid has the shape of a funnel 9.

A conventional reflux condenser or cooler 2 is centrally mounted on the reactor hood; this reflux cooler 2 has an amount of coolant flowing therethrough which is constant per unit of time. Vapors ascend from the gas space of the polymerization vessel into this reflux condenser or sooler 2. A portion of the vapors is condensed in the reflux cooler 2; the condensate which flows downwardly into the drain or duct 3, can be withdrawn therefrom with the aid of conduit 10 and can be fed back to the vessel at some other point or it may overflow at the upper edge 11 of the drain 3 and fall back into the funnel 9. A pipe 4 is attached to the head 2a of the reflux cooler 2, leading to a rotary pump 7. A control element 6 is provided in the pipe 4, in addition to a closure valve 5. The rotary pump 7 is connected by means of line 12, with the vessel hood by way of a closure valve 8.

If the vapors rising from the reactor into the reflux cooler 2 are free of solid particles, he greatest cooling effect is obtained if the gas is conducted from the reflux cooler 2 into the reactor hood by means of the rotary pump 7 by way of the conduits 4 and 12, i.e., if the gas is circulated in such a manner that the gaseous stream flows in the same direction as the vapor stream in the reflux condenser.

In contrast thereto, if the vapors entrain solid particles, these particles may cover the reflux condenser surfaces and may reduce the heat transfer. In this case, it is recommended to supply the gas from the reactor hood into the reflux cooler head — and thus in countercurrent to the vapors.

This forced circulation of the gas through the reflux cooler can be effected by means of a device provided on the outside of the reflux cooler for example, by means of a rotary pump, as well as with the aid of a device installed on the inside of the reflux cooler, for example with the aid of a blower. In the latter case, a conduit disposed externally on the reflux cooler and connecting the reflux cooler head with the gas space of the polymerization reactor is no longer necessary.

In both cases, the throughflow of the gas is varied in dependence on the temperature in the liquid space of the polymerization vessel in such manner that a rise in temperature effects an increase in the gas through flow and therewith in the cooling effect. In this way, the temperature in the liquid space of the polymerization vessel is controlled by varying the throughflow of the force-fed gas.

The change in gas throughflow can be achieved either by continuously varying the output of the gas-feed device or — as in the example of this invention — by the continuous change of the effective cross section of the gas conduit with the aid of a control element 6 with a constant output of the gas-feed device.

The effectiveness of the reflux cooling unit of this invention will be explained by reference to the following example.

EXAMPLE

In a polymerization reactor having a capacity of 100 m³, a charge of emulsion polyvinyl chloride was produced. The reflux cooler had a surface area of 170 m². The coolant for the reflux cooler was fresh water with an inlet temperature of 20°C.; the water was discharged from the reflux cooler heated to about 40°C. The rotary pump had a gas-feed capacity of about 100 m³/h. During the polymerization reaction, the internal pressure in the polymerization reactor was 8 to 9 atmospheres gauge; the temperature in the liquid space was 55°C. During the reaction period of 4 hours, 27 tons of emulsion-polyvinyl chloride was produced, corresponding to a heat of polymerization of about 12 million kilogram calories with an average heat load of 3 million kcal/h. This results in a heat transfer value in the reflux cooler of 720 kcal/m²·h·°C. The temperature in the liquid space was kept constant with an accuracy of ±1.5°C. During the reaction, no foams occurred, although the aqueous phase of the emulsion had an interfacial surface tension of 50 dyne/cm².

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A process for the cooling of polymerization charges in emulsion, suspension, solution, and bulk polymerizations in incompletely filled polymerization vessels having capacities of 40 m³ or greater and thermal loads of over 500,000 kcal/h, with the aid of a reflux cooler means which is in communication with a gas space containing a gas above and in contact with the polymerization charge in a polymerization vessel, which comprises force-feeding the gas from the gas space through a circulatory system comprised of the gas space and the reflux cooler means including a reflux cooler head, the forced-circulation of the gas through the reflux cooler means cooling said gas as well as the polymerization charge in contact therewith.

2. A process according to claim 1, characterized in that the gas is force-fed from the gas space through the reflux cooler means into the reflux cooler head and from the reflux cooler head into the gas space of the polymerization vessel.

3. A process according to claim 1, characterized in that the gas is force-fed from the reflux cooler head through the reflux cooler means into the gas space of the polymerization vessel and from the gas space into the reflux cooler head.

4. A process according to claim 1, characterized in that the temperature in the liquid space of the polymerization vessel is controlled by varying the rate of the throughflow of forced-circulated gas.

5. A process according to claim 1, characterized in that the circulatory system includes a conduit means in communication with said gas space and said reflux cool header, and pump means operatively associated with said conduit means, said gas being pumped through said circulator system.

* * * * *

UNITED STATES PATENT OFFICE
CERTIFICATE OF CORRECTION

Patent No. 3,785,430        Dated  January 15, 1974

Inventor(s) Kurt Pfeiffer; Johannes Dietrich; Günter Beckmann; and Karl-Heinz Herkt It is certified that error appears in the above-identified patent and that said Letters Patent are hereby corrected as shown below:

Title Page, after "[57] ABSTRACT" lines 6 through 15 which now read:

"This invention relates to a process and apparatus for the cooling of polymerization charges in emulsion, suspension, solution, and bulk polymerization in connection with incompletely filled polymerization reactors or vessels having capacities of 40 m$^3$ or greater and thermal loads of more than 500,000 kcal/h with the aid of a reflux condenser or cooler which is in communication with the gas space of a polymerization vessel."

Should read:

-- A process for the cooling of polymerization charges in emulsion, suspension, solution and bulk polymerizations in completely filled polymerization vessels having large capacities and high thermal loads which employ a reflux cooler means in communication with a gas space containing a gas above and in contact with the polymerization charge in the polymerization vessel which includes forcefeeding the gas from the gas space through a circulatory system comprised of a gas space and the reflux cooler means including a reflux cooler head so that the forced-circulation of gas through the reflux cooler means cools the gas as well as the polymerization charge in contact therewith. --

UNITED STATES PATENT OFFICE
CERTIFICATE OF CORRECTION

Patent No. 3,785,430            Dated    January 15, 1974

Inventor(s) Kurt Pfeiffer; Johannes Dietrich; Günter Beckmann; and Karl-Heinz Herkt        Page - 2

It is certified that error appears in the above-identified patent and that said Letters Patent are hereby corrected as shown below:

Column 1, after line 2, insert the following paragraph:

-- This invention relates to a process and apparatus for the cooling of polymerization charges in emulsion, suspension, solution, and bulk polymerization in connection with incompletely filled polymerization reactors or vessels having capacities of 40 $m^3$ or greater and thermal loads of more than 500,000 kcal/h with the aid of a reflux condenser or cooler which is in communication with the gas space of a polymerization vessel. --

Signed and sealed this 15th day of October 1974.

(SEAL)
Attest:

McCOY M. GIBSON JR.            C. MARSHALL DANN
Attesting Officer               Commissioner of Patents

UNITED STATES PATENT OFFICE
CERTIFICATE OF CORRECTION

Patent No. 3,785,430     Dated January 15, 1974

Inventor(s) Kurt Pfeiffer; Johannes Dietrich; Günter Beckmann; and Karl-Heinz Herkt It is certified that error appears in the above-identified patent and that said Letters Patent are hereby corrected as shown below:

Title page, after "[57] ABSTRACT" lines 6 through 15 which now read:

"This invention relates to a process and apparatus for the cooling of polymerization charges in emulsion, suspension, solution, and bulk polymerization in connection with incompletely filled polymerization reactors or vessels having capacities of 40 m$^3$ or greater and thermal loads of more than 500,000 kcal/h with the aid of a reflux condenser or cooler which is in communication with the gas space of a polymerization vessel."

Should read:

-- A process for the cooling of polymerization charges in emulsion, suspension, solution and bulk polymerizations in incompletely filled polymerization vessels having large capacities and high thermal loads which employ a reflux cooler means in communication with a gas space containing a gas above and in contact with the polymerization charge in the polymerization vessel which includes forcefeeding the gas from the gas space through a circulatory system comprised of a gas space and the reflux cooler means including a reflux cooler head so that the forced-circulation of gas through the reflux cooler means cools the gas as well as the polymerization charge in contact therewith. --

This certificate supersedes Certificate of Correction issued October 15, 1974.

Signed and sealed this 3rd day of December 1974.

(SEAL)
Attest:

McCOY M. GIBSON JR.
Attesting Officer

C. MARSHALL DANN
Commissioner of Patents